Oct. 10, 1967   E. G. BAILEY   3,346,672
METHOD FOR HEATING SOLID INORGANIC MATERIAL
Filed Sept. 26, 1966
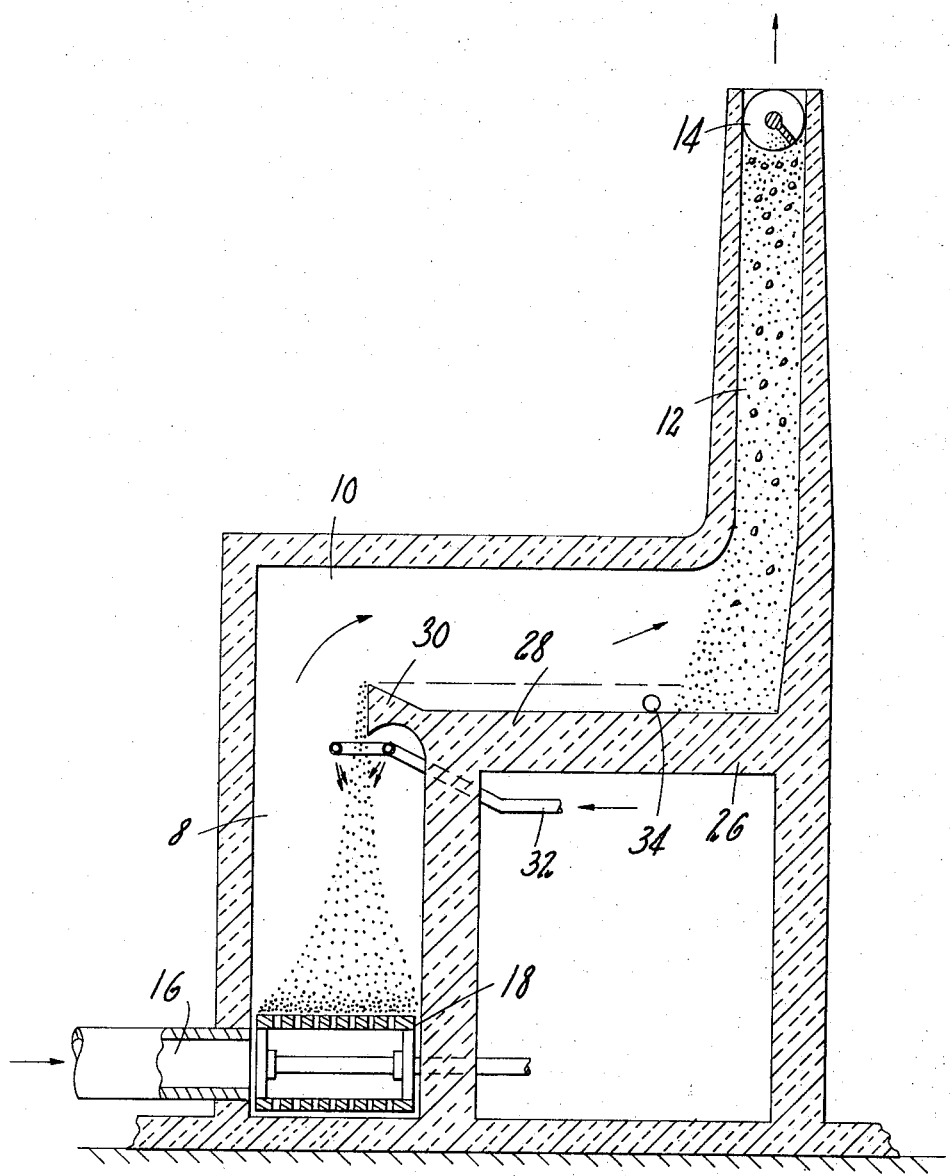

3,346,672
METHOD FOR HEATING SOLID INORGANIC MATERIAL
Ervin George Bailey, Bethlehem Township, Pa., assignor to Bailey Inventions, Inc., Easton, Pa., a corporation of Pennsylvania
Filed Sept. 26, 1966, Ser. No. 581,927
3 Claims. (Cl. 263—53)

ABSTRACT OF THE DISCLOSURE

Solid inorganic material to be heated is advanced, e.g. downwardly through a kiln, in loose admixture with pieces of solid carbonaceous fuel in counterflow relation to a stream of gaseous products of combustion of the solid fuel but reaction between gases in the stream and the solid fuel and consumption of the fuel is restrained during an initial portion of the advance by shrouding the individual pieces of carbonaceous fuel as they are fed, with a high melting point material which is melted off the fuel as the materials advance to allow the fuel to react with a counterflowing stream of combustion sustaining gas and heat the solid inorganic material.

Where the heat melts the solid inorganic material, as in producing cement clinker, the melted material is collected in a liquid pool and discharged into the incoming stream of air in counterflow relation thereto to solidify the discharged liquefied material.

---

This application is a continuation-in-part of co-pending application Ser. No. 307,390 filed Sept. 9, 1963, now abandoned.

This invention relates to a method for heating solid inorganic material with improved efficiency, and more particularly to a method for controlling reactions in inorganic solid materials at high temperatures, as in the production of cement clinker in a vertical kiln wherein inorganic materials are heated within the kiln by solid carbonaceous fuel fed into the top of the kiln in admixture with the charge of materials to be reacted.

It is a primary object of the invention to operate a vertical kiln in such manner as to provide a highly efficient production of cement clinker or other agglomerate by supplying the fuel to the kiln in a novel form. The fuel, in individual pieces, is encased, enshrouded, or otherwise sealed with a shroud in the form of an enveloping coating of a solid meltable material, which temporarily seals the surfaces of the fuel from exposure to any of the ascending gases while it is still in the upper part of the vertically descending reaction charge. The fuel is exposed to gases ascending through and out of the top of the charge only after the fuel has descended to the zone of the kiln where the temperature is sufficient to melt away, or otherwise remove, the shroud from the fuel.

The present application deals in particular with the use of shrouded fuel in an operation wherein the reacting materials are melted and collected in a molten pool from which portions are periodically or continuously removed and cooled to provide clinker which may subsequently be ground to commercial cement particle size.

A novel kiln in which the method in accordance with this invention may be practiced is shown in the accompanying drawing constituting a vertical section therethrough.

Such kiln apparatus is claimed in a previously filed division of said parent application Ser. No. 589,787 filed Sept. 1, 1966.

Refractory or fluid-cooled walls form two laterally offset vertical shafts 8 and 12 connected by intermediate horizontally extending means of communication 10 between the top of the lower shaft 8 and the bottom of the upper shaft 12.

The top of the upper shaft 12 is provided with a suitable worm 14 or other mechanical means for introducing a charge of solid material including shrouded coke or other shrouded combustible solid fuel intermixed with the solids to be reacted. The bottom of the lower shaft 8 includes an air inlet 16 and a moving cooling grate which may be in the form of a continuous mesh conveyor 18 for removing clinker formed as the result of the operation of the kiln.

Wall 26 defining the bottom of the upper vertical shaft 12 forms a hearth 28 adapted to retain a pool of molten material for which purpose its inner end terminates in an upwardly extending lip 30 overhanging the lower vertical shaft 8. Liquid material contained in a pool retained by the hearth 28 may thus continuously discharge over the lip 30 as it accumulates on the hearth 28. If desired an air line 32 may be provided to discharge air jets into the discharging stream to break up the stream and control in part the size of the clinker. As the discharged liquid drops through the lower vertical shaft 8 in counterflow with the incoming air introduced through inlet 16, it gives up its heat and is solidified for removal as clinker on the moving conveyor 18. A tap 34 permits cleaning out the hearth when operations are discontinued.

The molten pool on hearth 28 is continuously replenished from the downflow of molten material from the vertically descending charge of mixed raw reactable materials and shrouded fuel, shown in the shaft 12, the reactable materials being liquefied by the heat generated through combustion of the pre-heated fuel in reaction with pre-heated air ascending from the air inlet 16 up through the vertical and lateral pathways into the bottom of vertical upper shaft 12.

The efficiency of operation stems to a large extent from avoiding any burning of the fuel in the upper part of the shaft 12, where the heat generated farther down is absorbed by the descending charge, such as limestone, yielding products such as carbon dioxide, which escape through the top of the shaft 12. Shrouding of the fuel delays combustion of the fuel until the shrouding has been removed by exposure in the lower part of the shaft 12 to a high enough temperature to cause its liquefaction and removal. The shrouding of the fuel has the additional highly beneficial effect of preventing $CO_2$ or $H_2O$ ascending through the upper section of shaft 12 from contacting hot carbon contained within the shrouds. Such contact in the absence of the shrouds would reduce at least some of the $CO_2$ and $H_2O$ in the upper section of shaft 12 to CO and $H_2$, the latter then escaping unburned with the waste gases, representing a great loss.

The increased efficiency thus secured by way of transfer of more heat from the ascending gases to the incoming charge before their escape as top waste gases, is supplemented by the pre-heating of the incoming air through counterflow heat exchange with the molten mix as it drips over the lip 30 and descends through the lower vertical shaft 8. This heat exchange acts to solidify the withdrawn portion into clinker which is removed as such by the conveyor 18.

The kiln, in combination with the shrouded fuel method of operation thus provides, (1) an efficient pre-heating of the incoming air and (2) an efficient pre-heating of the incoming charge by reason of a concentration of the combustion reaction in the lower part of the charge so that all the gases are complete products of combustion of C and $H_2$ (i.e. $CO_2+H_2O$) long before they reach the top of the shaft 12 and escape, and of the resulting long path of heat exchange contact between the very hot $CO_2$ gases and the relatively cool incoming charge.

While the particular nature of the shrouding material may vary in accordance with the particular raw materials which are intended to be reacted, there may be taken as an example the production of alumina cement clinker (calcium aluminate, known commercially as lumnite). Since the reacting and fluxing temperature of this material is of the order of 2400° F., the shrouding material should be chosen so that it becomes molten, exposing the solid fuel to the combustion-sustaining gas, at about this temperature. To this end, it should have a melting point of the order of 2200° F. An example of desirable material in the production of calcium aluminate is a low-grade bauxite or an aluminous clay because these materials react with, and become a part of, the calcium aluminate together with the ash in the fuel. The coke may be shrouded with such material, for example, by pulverizing the refractory, forming a slurry and then dipping coke or other prepared metallurgical size carbon fuel pieces into the slurry, removing and drying to coat the fuel pieces with an adherent protective coating. Hot fuel, as it comes from the coking operation, may be dropped into a slurry so as to draw the refractory into the pores of the fuel as it cools. The result will be to improve the adhesion of the shroud.

The kiln may be started up from cold by establishing combustion with unshrouded fuel and a charge having a low melting temperature with or without enrichment of the air with oxygen, and then converting gradually to the desired materials and temperature and steady operating conditions.

What is claimed is:

1. A method for the efficient production of solid aggregate from solid reactable inorganic materials comprising advancing solid inorganic materials to be reacted in admixture with a solid carbonaceous fuel in counterflow relation to a stream of gaseous products of combustion of said solid fuel, while restraining the fuel from reacting with said gases during the initial portion of advance of said fuel therethrough, and exposing said fuel to combustion-sustaining air after said fuel has proceeded through said restrained-combustion path of travel, to melt said reactable materials, collecting said melted material in a liquid pool, and discharging said melted material from said pool and advancing said discharged material in relative counterflow relation to the stream of combustion-sustaining air, as it is being fed towards said fuel, to solidify said discharged material into solid aggregates.

2. A method as claimed in claim 1, wherein the solid fuel is shrouded by a material having a melting point in excess of the desired temperature of the counterflowing gases throughout the reaction-restraining portion of the path of travel of said fuel.

3. A method as claimed in claim 1, wherein the gaseous products of combustion flow vertically upwardly in counterflow relation to inorganic materials moving vertically downwardly.

References Cited

UNITED STATES PATENTS

| | | | |
|---|---|---|---|
| 1,366,479 | 1/1921 | Newberry | 263—53 |
| 1,895,284 | 1/1933 | Hay | 263—29 |
| 2,923,539 | 2/1960 | Meyer | 263—53 |
| 3,098,886 | 7/1963 | Friese | 263—53 |

FOREIGN PATENTS 241    1902   Great Britain.

FREDERICK L. MATTESON, Jr., *Primary Examiner.*

JOHN J. CAMBY, *Examiner.*